R. SVIONTEK.
MEAT HOLDER.
APPLICATION FILED JUNE 20, 1921. RENEWED APR. 24, 1922.

1,418,213.

Patented May 30, 1922.

Witnesses:

Inventor
Roman Sviontek
His Attorney

UNITED STATES PATENT OFFICE.

ROMAN SVIONTEK, OF CHICAGO, ILLINOIS.

MEAT HOLDER.

1,418,213.  Specification of Letters Patent.  Patented May 30, 1922.

Application filed June 20, 1921, Serial No. 478,968. Renewed April 24, 1922. Serial No. 556,358

*To all whom it may concern:*

Be it known that I, ROMAN SVIONTEK, a citizen of the United States, and a resident of the city of Chicago, county of Cook, and State of Illinois, have invented certain new and useful Improvements in Meat Holders, of which the following is a specification.

This invention relates to a meat holder and has for its object the provision of a small stand in which hams, shoulders, and other cuts of meat may be supported and clamped in position so as to allow the same to be conveniently and accurately cut.

Other objects will appear hereinafter.

The invention consists in the combinations and arrangements of parts hereinafter described and claimed.

Figure 1:
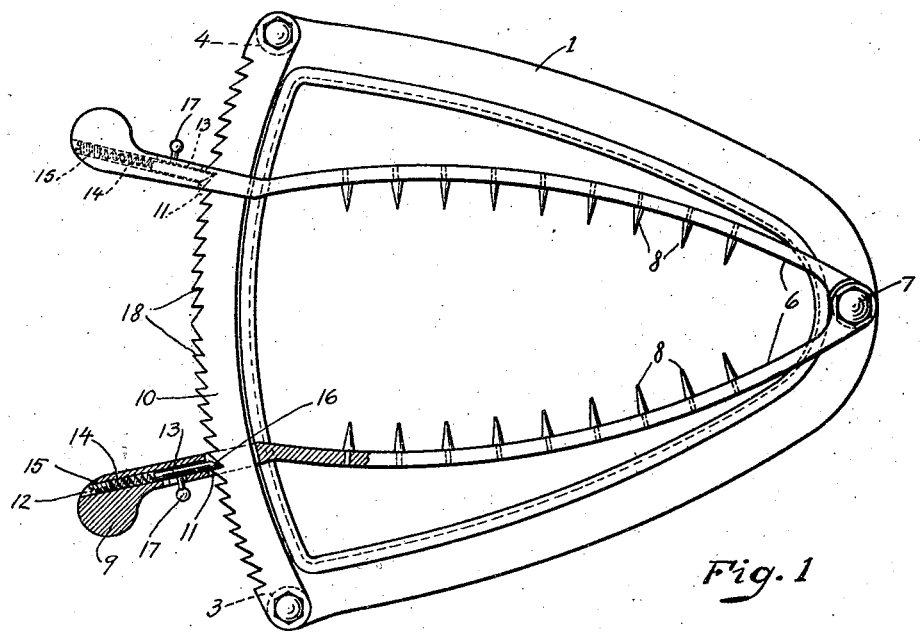
Figure 2:
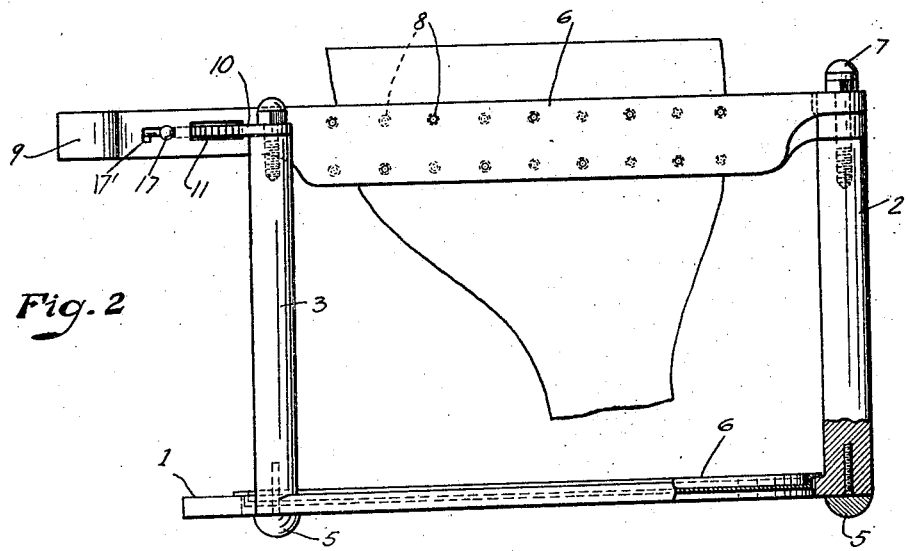

The invention will be best understood by reference to the accompanying drawings forming a part of this specification, and in which, Fig. 1 is a top plan view, partly in section, of the invention; and Fig. 2 is a side elevation of the invention showing a ham supported thereby.

The invention preferably consists of a support of such size that it may be conveniently placed on a counter, meat block or table. It is adapted to be used in the home, butcher shops, or grocery stores, to provide a convenient means for supporting meat while same is being cut.

The invention preferably comprises a triangular base plate 1, which is preferably cast with legs or posts 2, 3 and 4 thereon. In order to prevent marring of the surface on which the device may be placed casters 5 are preferably secured to the base plate, as shown.

The base plate 4 is also preferably cast with a shallow basin 6 in its upper surface to catch drippings from the meat suspended above same.

On the upper end of the post 2 are pivotally mounted arms 6, one on top of the other, by means of a screw 7 which engages a threaded socket in the top of said post. The arms 6 are provided with spikes 8 which project toward each other, and said spikes are preferably mounted on each arm in staggered relation, as shown in dotted lines in Fig. 2, as by means of this construction the meat is held more firmly when the device is operated.

One arm 6 is provided with a handle 9 at its end which is adapted to slidably engage a segmental rack bar 10, by means of a slot 11 therein. The handle 9 is provided with a longitudinal bore 12 in which is mounted a pin 13 which is normally projected into engagement with the rack 10 by means of a spring 14 which bears against said pin, the spring being retained in said bore by means of a set screw 15 threaded into the bore 12. The engaging end of the pin 13 is preferably beveled, as shown at 16, so that same will slide along the rack 10 when moved in one direction, but will engage the teeth of said rack when moved in the opposite direction. A lug 17 is provided on said pin 13 which projects from the handle 9 through a slot therein, the lug being used to withdraw the pin 13 from engagement with said rack 10. A notch 17' is provided in the slot in the handle 9 which is adapted to be engaged by the lug 17 to hold the pin 13 in retracted position when desired. Both arms 6 are similar in all respects except being oppositely disposed and I have designated similar parts of same with the same reference numerals.

The rack bar 10 is mounted on the upper ends of the posts 3 and 4 and is provided with oppositely disposed teeth 18, the teeth on one portion of the rack bar being inclined toward the teeth on the opposite portion of the rack bar as shown in Fig. 1. When the handles 9 are moved toward each other along the rack 10, the pins 13 slide over the teeth on said rack, but in order to move the handles in the opposite direction it is necessary to withdraw the pins from the rack by means of the lugs 17 in said handles. The arms are pivoted to move independently of each other and both may be moved toward each other by sliding same over the teeth 18, or may be moved away from each other by retracting the pins 13 from engagement with the teeth 18, or both arms may be moved in the same direction or one may remain stationary and the other one be moved toward or away from same, the arms being independently movable with respect to each other in order to accommodate various sizes of hams, shoulders, etc., so that same may be conveniently and accurately cut.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. A meat holder of the character described comprising swinging arms mounted on a support; a segmental rack mounted on said support; slots in said arms slidably embracing said rack; handles on said arms; bores extending through said handles and communicating with the slots in said arms; and spring pressed pins slidably mounted in said bores normally engaging said rack, substantially as described.

2. A meat holder of the character described comprising swinging arms mounted on a support; a segmental rack mounted on said support and having oppositely inclined teeth thereon; slots in said arms slidably embracing said rack; handles mounted on said arms; bores extending through said handles and communicating with the slots in said arms; and oppositely bevelled spring pressed pins normally engaging the teeth on said rack and freely movable toward each other but locked against movement away from each other, substantially as described.

3. A meat holder of the character described comprising swinging arms mounted on a support; a segmental rack mounted on said support and having oppositely inclined teeth thereon; slots in said arms slidably embracing said rack; handles mounted on said arms; bores extending through said handles and communicating with the slots in said arms; oppositely bevelled spring pressed pins normally engaging the teeth on said rack and freely movable toward each other but locked against movement away from each other; apertures in said handles communicating with said bores; lateral projections on said spring pins for disengaging same from the teeth on said rack; and notches for said projections in the outer ends of said slots for retaining said spring pins in disengaged position, substantially as described.

In testimony whereof I have signed my name to this specification in the presence of two subscribing witnesses.

ROMAN SVIONTEK.

Witnesses:
JOSHUA R. H. POTTS,
FREDA C. APPLETON.